US008965889B2

(12) United States Patent
Chan et al.

(10) Patent No.: US 8,965,889 B2
(45) Date of Patent: Feb. 24, 2015

(54) BI-TEMPORAL USER PROFILES FOR INFORMATION BROKERING IN COLLABORATION SYSTEMS

(75) Inventors: Eric S. Chan, Fremont, CA (US); Adel Ghoneimy, Hillsborough, CA (US); Dieter Gawlick, Palo Alto, CA (US); Terry M. Olkin, Niwot, CO (US)

(73) Assignee: Oracle International Corporation, Redwood Shores, CA (US)

( * ) Notice: Subject to any disclaimer, the term of this patent is extended or adjusted under 35 U.S.C. 154(b) by 60 days.

(21) Appl. No.: 13/401,195

(22) Filed: Feb. 21, 2012

(65) Prior Publication Data

US 2013/0066866 A1 Mar. 14, 2013

Related U.S. Application Data

(63) Continuation-in-part of application No. 13/227,623, filed on Sep. 8, 2011.

(51) Int. Cl.
*G06F 17/30* (2006.01)
(52) U.S. Cl.
CPC .... *G06F 17/30699* (2013.01); *G06F 17/30551* (2013.01)
USPC ........................................................ 707/732
(58) Field of Classification Search
CPC ..................... G06F 17/30551; G06F 17/30699
USPC ........................................................ 707/732
See application file for complete search history.

(56) References Cited

U.S. PATENT DOCUMENTS

| 6,385,616 | B1 * | 5/2002 | Gardner ................................. 1/1 |
| 6,385,619 | B1 * | 5/2002 | Eichstaedt et al. ............ 707/748 |
| 6,640,229 | B1 * | 10/2003 | Gilmour et al. ................ 707/784 |
| 7,181,518 | B1 * | 2/2007 | Matsumoto et al. .......... 709/224 |
| 7,493,372 | B2 * | 2/2009 | Crabtree et al. ............... 709/217 |
| 7,797,289 | B2 | 9/2010 | Chan et al. |
| 2003/0144977 | A1 * | 7/2003 | Suda et al. ....................... 706/46 |
| 2011/0320419 | A1 * | 12/2011 | Johnston et al. .............. 707/703 |
| 2012/0005209 | A1 * | 1/2012 | Rinearson et al. ............ 707/737 |
| 2012/0066073 | A1 * | 3/2012 | Dilip et al. ................. 705/14.66 |

OTHER PUBLICATIONS

Bohlen, Michael et al., Querying TSQL2 databases with temporal logic, 1996, Advances in Database Technology—EDBT '96 Lecture Notes in Computer Science, vol. 1057/1996, 325-341.*

(Continued)

*Primary Examiner* — Apu Mofiz
*Assistant Examiner* — Dara J Glasser
(74) *Attorney, Agent, or Firm* — Kraguljac Law Group, LLC

(57) ABSTRACT

Systems, methods, and other embodiments associated with bi-temporal user profiling are described. An event is detected that occurs at a valid event time. In response to the event, a repository is accessed that stores data describing one or more user profiles that include a profile record valid time period specifying a time at which the given profile record is valid. A prior user profile record is retrieved that has a profile record valid time period that overlaps with the valid event time. An updated user profile record is created based, at least in part, on the event. The updated user profile record is saved with the valid event time demarcating the start of a profile valid time period. The prior user profile with the valid event time demarcating the end of the profile record valid time period is also saved for subsequent processing.

23 Claims, 9 Drawing Sheets

(56) References Cited

OTHER PUBLICATIONS

Bourigault et al., "Term Extraction+Term Clustering: An Integrated Platform for Computer-Aided Terminology," Proceedings of EACL '99, pp. 15-22.

Wacholder et al., "Toward a Task-based Gold Standard for Evaluation of NP Chunks and Technical Terms," Proceedings of HLT-NAACL, 2003, pp. 1-8.

Atro Voutilainen, "NPtool, a Detector of English Noun Phrases," in Proceedings of the Workshop on Very Large Corpora. 1993, pp. 48-57.

Lenat, et al., "CYC, WordNet, and EDR: Critiques and Responses," Communications of the ACM, Nov. 1995, pp. 45-48.

* cited by examiner

BI-TEMPORAL USER PROFILES FOR INFORMATION BROKERING IN COLLABORATION SYSTEMS

CROSS REFERENCE TO RELATED APPLICATION

This disclosure claims priority to and is a Continuation-in-Part of U.S. patent application Ser. No. 13/227,623 filed on Sep. 8, 2011, entitled "Implicit or Explicit Subscriptions and Automatic User Preference Profiling in Collaboration Systems," which is incorporated herein by reference in its entirety for all purposes.

BACKGROUND

Many enterprises use collaboration systems, including content management systems and case management systems, that manage and store large amounts of data. The collaboration systems typically use different types of policy, workflow, and/or preference frameworks to aid the process of administering and accessing data in the content management system. Policies are generally used to centralize business rules, while workflows typically control a chain of actions, such as sequences of approvals that are to be performed when certain events occur. The policies and workflow combine to provide users of the content management system with access to the data they need in a timely manner without overloading the user with too much information.

Collaborative content management systems often provide ways for users to customize the behavior of the content management system with respect to their interaction with the system. Preferences, profiles, and subscriptions are examples of customization features provided by some content management systems. Preferences maintain settings that specify choices, courses of actions, or customization associated with a user or a group of users. Profiles correspond to instances of preferences related to a present user context. For example, a user may have a work profile in which she desires to receive notification of any meetings on certain projects when they are scheduled. The user may have a vacation profile in which she receives no notifications of meetings and is notified only of e-mail messages marked urgent. Subscriptions allow a user to specify conditions and actions to be taken when certain events occur. For example, a user may subscribe to any documents that are produced in a given project's workspace. The user is then notified when a new document is saved to the system or an existing document is revised.

As a user's preferences evolve, the user's profile may change to reflect new preferences. These changes to the user's profile may occur automatically by virtue of automatic profile extraction techniques described in the parent patent application Ser. No. 13/227,623 referenced above. Thus, the profile provides an up-to-date snapshot of a user's current interests and assignments.

Temporal databases can implicitly manage time-varying data, such as user preference profiles, by associating valid time and transaction time information with each profile record or row of a database table. In some contexts, the terms "valid time," "valid event time," and "user time" are used synonymously to denote the time when a fact is valid in the real world. On the other hand, the terms "transaction time" and "system time" are used synonymously to denote the time when a fact is stored in the database. SQL queries that involve both valid time and transaction time are called bi-temporal queries and the data is called bi-temporal data. The valid times are coalesced into a valid time period represented by a valid time start and a valid time end. Temporal database features have continued to evolve in several commercial databases.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
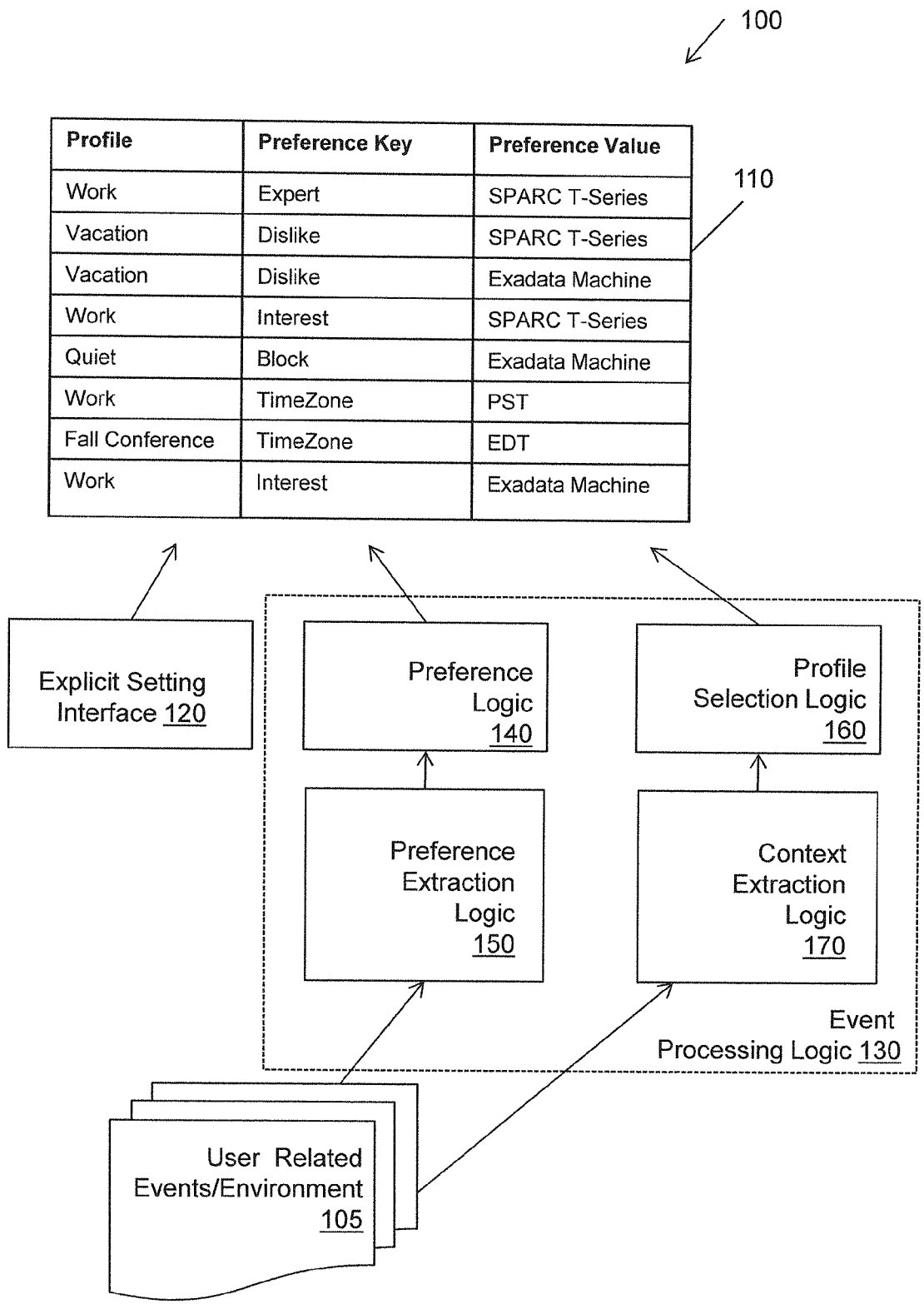
FIG. 1 illustrates one embodiment of a system associated with event processing.

One goal of a collaborative content management system is to provide users with access to documents, messages, and data they need to collaborate with other users while enforcing business rules such as access policies and document handling protocols. To provide a good end-user experience, the user can customize many aspects of the system's behavior to suit their own tastes. However, it can become burdensome for a user to manipulate all of the settings necessary to fully specify their desired system behaviors. Further, the user may not be aware of the breadth of resources available on the system and thus may not be able to take advantage of them. For example, because a user must specify a certain type of document when creating a subscription, a user cannot subscribe to documents that he does not know about. In addition, the system may not be aware of users with an expertise in a certain area, unless the user has been explicitly designated as such. This may hamper workflow when a pre-designated expert is not available to participate in a process that requires an expert. The term "user" as used herein can refer to an individual user, a group of individual users, or an organization of individual users.

Timely delivery of mission critical information can be enhanced by deploying an information broker or mediating agents, which treat all users in the system symmetrically as both producers and consumers of information. Users should not have to explicitly publish events or subscribe to events. Rather, publish and subscribe activities are delegated to the mediating agents, which evaluate the user contexts and prioritize the information delivery by "need to act," "need to know," "nice to know," and so on, criteria.

For example, if a patient's primary doctor is performing surgery at the time of an incidence, the system must alert another doctor on "need to act" criteria. The primary doctor may still be notified on "need to know" criteria. Here mediating agents evaluate the presence, context, and workload of the users. Mediating agents prioritize the information delivery by classifying the users as responsible experts (who may need to act) or as interested parties (who need to know, who might like to know) through automatic user profiling. A user's expertise and interest profiles are compiled by the system, which analyzes the user's communications and contributed content using natural language processing and other techniques. The mediating agents can evaluate the user expertise or interest profiles to implicitly identify the subscribers and to classify the subscribers by "need to act," "need to know," "nice to know" and so on.

Profile information provides a snapshot of a user's preferences, including expertise, interests, likes, dislikes, recommendations, and so on, at the present time. When profile information is updated, historical information about the user preferences may be lost, which may have been useful in some situations. For example, in a post mortem analysis of a response to an emergency situation that occurred several years ago, it may be useful to be able to identify personnel that were classified as experts in disaster response at the time of the emergency. Due to changing assignments or training, personnel who are presently experts may not have been experts at the time of the emergency.

It may also be the case that the personnel who were identified as experts at the time of the emergency may no longer be experts at the current time. This can happen because the confidence level of an expertise area for a user can decrease with time if the associated terms are not detected in the user's recent activities, perhaps due to career changes. In time of emergency, it may be necessary to locate any personnel who has a certain expertise at present or any point of time in the past. In a converse use case, it may be useful for the system to reproduce the time varying state of an emergency response system from the historical data (using a temporal database) to conduct what if analysis against the expertise profiles of the personnel at the current time. This can reveal the readiness of the emergency response personnel at the current time in comparison to the effectiveness of the personnel in the past. Such a study can expose the expertise areas that need to be filled.

Systems and methods are described herein that provide bi-temporal profile information about users. Each record in a user profile data (e.g., row in a table) is associated with a valid time period (represented by a valid time start date and a valid time end date). In some cases the valid time period may start at the update time corresponding to an event that changed the profile record. If the profile record is updated again, a new profile record will be added to the user profile table with the "valid time start" set to the last update time while the "valid time end" is set to null to indicate that the valid time period extends into the future. The previous profile record will be stored as a historical record with the "valid time start" as previously set and "valid time end" set to the last update time. Prior user profile records are stored with their associated valid time periods so that a progression of user profile historical records is stored in a profile repository.

The user profile tables can be configured to support bi-temporal capabilities. In the temporal database, a user profile snapshot as a point of time in the past, i.e., historical data, can be queried. The point of time of a query for historical data can be specified in valid time, transaction time, or both. The historical data of a user profile can be updated at any valid time which is different from the transaction time. The transaction time of a database update operation is implicitly the current system time. The bi-temporal feature that combines the valid time and transaction time enables provenance of historical data, i.e., one can determine which transaction has updated historical data, and if necessary revert the changes of the most recent transactions.

The systems and methods described herein incorporate new solutions that may apply natural language processing (NLP) and expertise finder tools to extract a user's expertise and interests (in the form of noun phrases or topics) from the user's contributions to a content management or messaging system. A detailed description of an expertise finder tool may be found in U.S. Pat. No. 6,640,229, which is incorporated herein by reference in its entirety. The noun phrases or topics that are extracted by the tools are included among the user preferences. The user may classify the noun phrases or topics as being an area of expertise, an interest, a like, a dislike, a recommendation, and so on. In addition, the preferences may be aggregated under different profiles. The user preference profiles are applied to create explicit or implicit subscriptions for events or conditions in the environment.

The type of information extracted by NLP includes terminology noun phrases (NP), named entities (NE), co-references of named entities, attributes of named entities, relationships among named entities, events and participating named entities, semantic characterization of named entities by taxonomy or ontology, types of relationships among named entities, to name some of the common extraction tasks. Among these information extraction (IE) tasks, the terminology noun phrase extraction task can perform satisfactorily for an unrestrictive domain of corpus while other tasks require a critical mass of domain specific terms, ontology, and rule calibration to perform satisfactorily for a specific domain of corpus.

The IE tasks are listed above in general order of increasing complexity with each succeeding task depending on the capability of the preceding task. For example, the named entity extraction task typically depends on the capability of the noun phrase extraction task and the co-reference task typically depends of the noun phrase and named entity recognition tasks in order to recognize that a noun phrase such as "the $44^{th}$ President of the United States" is a co-reference of the named entity "Barack Obama" in the text.

The attributes of named entities are extracted by a template element (TE) production task, which can fill in the "the $44^{th}$ President of the United States" as a title of "Barack Obama." The relationships among named entities are extracted by a template relation (TR) production task, which can fill in a president and first lady relationship "Michelle Obama is the wife of Barack Obama" from a sentence like "First Lady Michelle Obama is the wife of the $44^{th}$ President of the United States."

Events and participating named entities can be extracted by a scenario template (ST) production task. For example, the ST may process the sentence "in 2011, John Smith competed on the quiz show Trivia Today, winning the first prize by outperforming his competitors Joe Ford and Tom Jones." From this sentence the ST task can detect a quiz show Trivia Today event in 2011 and characterize the three participants of the event: John Smith, Joe Ford, and Tom Jones. The named entity classification and relation type recognition task can characterize that the quiz show Trivia Today event is a "television show."

The performance of an IE task is measured by precision, recall, and F-measure. The precision of an extraction task measures the percentage of extracted items that are relevant for extraction by the task, whereas the recall measures the percentage of relevant items among all items extracted by the task. For example, an IE task is extracting terms that are relevant to a given topic out of a pool of terms, 50 of which are relevant to the topic. If the task identifies 40 terms as relevant, 30 of which are actually relevant, then the precision of the task is 30/40, or the number of actually relevant terms divided by the total number of terms identified by the task. The recall of the task is 30/50, or the number of terms identified by the task that are actually relevant divided by the total number of relevant terms in the pool of terms.

Put another way, a higher precision typically implies that the task is more selective and the identified terms are more likely to be relevant. A high precision task entails a greater risk of not identifying all relevant terms. A higher recall typically implies that the task is less selective, and the identified terms include more non-relevant terms. A task with a high recall entails a greater risk of identifying non-relevant terms. The F-measure of an extraction task is a weighted harmonic mean of the precision and recall measures of the task. It provides a single measure that trades off the precision and recall performance of a task.

In the processing of subscriptions, precision and recall can be traded off by calibration of the information extraction tasks. To this end, some of the terminology noun phrase extraction tools perform term normalization. For example, an extraction task that normalizes the terms into compound nouns can recognize that the terms such as "nuclear reactor fuel" and "nuclear reactor spent fuel" are related by indicating the latter is more specific than the former. Normalization can be achieved by a shallow grammar (i.e., a task that looks to surrounding words to analyze a given word) that detects the adjective modifier, in this case "spent," between two nouns in the phrase. The recall measure can increase by treating "nuclear reactor spent fuel" as relevant to subscriptions for "nuclear reactor fuel" without affecting the precision. However, if "nuclear reactor fuel" is treated as relevant to a subscription for "nuclear reactor spent fuel," the recall measure increases at the expense of the precision measure. Depending on the weights of precision and recall, the F-measure can indicate overall improvement or deterioration of conflating two terms for subscription filters.

A noun phrase is a grammatical unit that is centered around a head noun with expansion words comprised of adjacent nouns, prepositions, and postpositions (e.g., of, on, in, under, etc. . . . ) and function words (e.g., a, the, and, not, may, will, etc. . . . ). Noun phrases are commonly used as index terms for large bodies of texts. A subset of noun phrases extracted from a corpus can comprise the core terminology of the domain of the corpus. Longer noun phrases, measured by the number of words and composition complexity (number of prepositions) are considered to represent more refined concepts of the corpus. Many terminology noun phrase extraction tools focus on detecting maximal length noun phrases. The noun phrase extraction task depends on preprocessors that tokenize the natural language texts into words, that split the sentences, and that annotate the words with tags identifying the word's part-of-speech. Tags include noun, verb, adjective, adverb, preposition (e.g., of, in, etc. . . . ), conjunction (e.g., and, but, or, etc. . . . ) article (e.g., a, an, etc. . . . ), modal (e.g., may, will, etc. . . . ).

The part-of-speech (POS) tagging task employs a list of lexicons with a morphological analysis of words or a probabilistic language model of word sentences to tag the words. Morphological analysis involves analysis of affixes to a lemma (a base word) to identify the part-of-speech of a word. For example, a word with the suffix "ness" is determined to be a noun derived from an adjective, such as correctness. Some POS tagging tasks can add the morphological distinctions such as inflection, derivation, and syntactic functions in the tags. In addition to morphological analysis, some POS tagging tasks employ context-sensitive syntactic rules to resolve conflicts. For example, the English word "fly" can be a verb or a noun. In the sentence "A fruit fly landed on an apple," a POS tagging task can recognize that "fly" is part of the compound noun "fruit fly" in the context of (subject) "fruit fly," (verb) "landed," (preposition) "on," (object) "an apple."

A POS tagging task may also employ morphosyntactic rules to resolve the POS of the word "fly" in the sentence "It is interesting to see a fruit fly through a microscope." By morphological analysis of the word "fly" with the inflection "flies" and a syntactic rule which expects the inflection "flies" (barring a typographical error) for agreement with the singular cardinality of "a fruit," a POS task can score "fruit fly" as a compound noun. Some NLP tools employ expanded lists of lexicons to resolve syntactic ambiguities. The noun "fruit fly," which is part of the English language vocabulary, can inform a probabilistic language model to assign a zero probability of classifying a verb "fly" following "fruit." Humans can employ extra-syntactic or semantic knowledge to recognize that a fruit cannot fly or things cannot fly through a microscope lens. NLP tools may employ external knowledge bases such as Wordnet, Cyc, and EDR to aid in these analyses.

Once the words in a sentence are tagged by part-of-speech, the maximal length noun phrases can be extracted by shallow grammars, such as by the use of regular expressions. Given that nouns are denoted by N, adjectives by J, and determinants by D, then the regular expression D?J*N+ recognizes any noun phrase that has an optional determinant followed by zero or more adjectives followed by one or more nouns. The noun phrase "the traveling salesman" matches this regular expression. The noun phrase extraction tasks typically extract the longest noun phrase that matches a regular expression.

Terminology noun phrases are subsets of noun phrases. One or more noun phrases may be extracted by splitting the maximal length noun (MLN) phrases at conjunction/preposition word boundaries and removing pronouns, articles, and definitives. Shorter noun phrases that occur relatively frequently in the corpus are potential terminology noun phrases. For example, the phrase "the Association of Computing Machinery" can be split from an MLN phrase "Communications of the Association of Computing Machinery" by removing one of the prepositions "of." "The Association of Computing Machinery," combined with the acronym ACM, is a common terminology noun phrase or topic for computing literature.

For automatic preference profiling, the terminology noun phrases or terms extracted by analysis of natural language text in the messages, documents, forums, blogs, etc., are automatically assembled into user or group preference profiles. Each term in the preference profiles can be assigned a confidence level that is derived from several feature measures, such as the term's length (measured in number of words), the number of lexemes from terminology lexicon, the complexity of composition (number of prepositions) in the term, the frequency of occurrence of the term within the user or group contributed content, the density of the term within the user or group contributed content, the frequency of the term in the corpus of all contributions from all users, the zone of occurrence of the term (e.g., title, subject field, abstract, conclusions, body, etc. of the artifact) and a measure of inverse author frequency.

The inverse author frequency, analogous to inverse document frequency (idf) for document ranking (tf-idf) in information retrieval, is given by the logarithm of the ratio of the number of all authors and the number of authors who write about the term. The inverse author frequency measures the selectivity of the authors by the term; its value is higher for the terms that belong to the preference profiles of a smaller percentage of authors (i.e., relatively few authors have expertise in the topic).

There are several approaches to scoring the confidence level from these separate quantitative feature measures. In one example approach, the confidence level is grouped into a small number of qualitative grades (e.g., 0-5, with 5 being the highest and 0 being the lowest) and each of the quantitative feature measures is classified by the qualitative grades. The confidence level grade is then derived as a grade point average of the grades for feature measures. The confidence level grade can also be derived by decision trees from the feature grades. This approach of classifying the grades for each feature measure and deriving the grade for confidence level can employ machine learning or manual calibration. The grading rules can accommodate personalization for an organization, group, or user experience.

Since the confidence level of a term in a preference profile changes with each new occurrence of the term in the overall corpus and each new reference of the term by any author, the system may continuously update the confidence levels across all profiles. A user or group may categorize the terms as expertise, interest, like, dislike, recommendation, etc. The same term can be classified differently in different preference profiles for a user or group. The assembled terms and corresponding confidence levels in a given category (e.g., interest category) in a preference profile are part of the conditions for subscriptions and filters for selecting relevant artifacts among streams of new contents. If the confidence level of a term in a preference profile is high enough, for example, graded 4 or higher, a new document that contains a single matching term may satisfy the filter conditions. On the other hand, several more matching terms with low confidence levels, for example, 1 or lower, in a preference profile may be required for a new document to satisfy the subscription filter condition.

Here is one scenario of how the user preference profiles can be used for explicit or implicit subscriptions. A given user has two profiles, "At Work" profile and "On Vacation" profile. A noun phrase such as "Nuclear Reactor Spent Fuel" that the user has frequently written about or searched for can be automatically profiled by the system as an element of the user preferences. The user may classify the related phrases "Radiation Leak", "Radiation Risk", "Nuclear Power Plant", "Nuclear Reactor Spent Fuel," "Nuclear Crisis Management" as her interests or expertise in one or more of her profiles. The system can match the noun phrases from the news feeds, for example news from a recent nuclear power plant crisis, with the users' preference profiles and generate alerts for the user. The user may classify the above topics as her interests and expertise in her "Work" profile and as expertise in her "Vacation" profile.

This configuration can be interpreted by the system to mean that while at work, the user is interested in receiving notifications about these topics in the news. However, if she is on vacation, she is willing to receive notifications about these events in the news if the system determines that it is urgent enough for her attention. This may be the case if the system cannot find another user who has expertise in the same topic, i.e. listed as his or her expertise in the active preference profile. By classifying the topics as her interests in the "Work" profile, the user is subscribing for notification of these events. Classifying the topics as expertise on the other hand, the user is deferring to the system to push the notifications to her only as task assignments.

Preferences can be associated with enterprises as well. An enterprise can have preference profiles for detecting events. For example, an enterprise may have a "QUIET Period" profile which becomes active around the end of the quarter and before the release of the quarterly earnings report. This profile may change the conditions for detecting the events based on the context or condition of the environment (within two weeks of the end of the quarter is a condition of the calendar).

In another of example, the a governmental department may have profiles corresponding to the color-coded alert levels. These profiles may change the conditions for detecting events for notifications or dispatches. Subscribers of notifications can be individual users as well as groups of users. Groups can be represented by their shared spaces and the notifications may be posted on the wallpaper, forum, and activities streams of a team space. The space can be associated with preferences and profiles of preferences. The system can automatically build the team space preferences by detecting events in the team space and extracting the topics associated with events.

The bi-temporal profile system and methods described herein may be implemented using temporal database technology that enables storage of historical versions of data. This version saving feature can be enabled for user profile data so that prior user profiles may be stored along with a present user profile. Querying of the profile data as of any valid time or transaction time and retroactive or predictive update for any valid time (in the past or future) may be supported.

With reference to FIG. 1, one embodiment of system 100 that provides event processing is illustrated. The system stores "artifacts" and processes "events." An artifact can be defined as a type of entity that results from some type of communication or collaboration and that has been assigned a unique identifier. A simple event can be defined as an occurrence of some action in the system or an operation on an artifact that is stored in the system. Example simple events would include the uploading of a document, the sending of an e-mail, the scheduling of a meeting, and the creation of slides for a presentation. Complex events can be defined as conditions over temporal state sequences. Example complex events include the example complex event patterns specified in temporal logical expressions in this specification.

A collaborative content management system typically maintains the creation date and last modification date of each artifact. To enable bi-temporal capability, each artifact can be associated with a user creation date and a user last modification date which may be different from the creation date and last modification date. The user creation date and user last modification date can represent the valid times when the user created or updated the content. For example, a user may create a document in an offline device and later upload the document into the system. In this case, the user creation date of the document is earlier than the system creation date when the user uploads the document into the system. The user creation dates and user last modification dates of a document can be treated as valid times while the creation date and last modification date implicitly represent the transaction times in the bi-temporal database.

In the case of e-mail messages, the system maintains the sent time and delivered time of each message, in addition to the creation date and last modification date. When an e-mail message delivered into an inbox is copied into different folders or migrated into different e-mail systems, the sent time and delivered time remain unchanged and can be treated as valid times for the content while the creation date and last modification date implicitly represent the transaction time when the e-mail message is copied or migrated.

Similar temporal bifurcation can be observed in online conferences. A conference folder in a collaborative content management system can be associated with a series of session metadata information that includes session start times and end times. There is usually a delay to transcribe the audio and video recordings into text and to store the transcripts in the conference folder. The period between session start time and end time can be treated as valid times for the content creation while the creation date and last modification date implicitly represent the transaction time when the transcripts are stored in the online conference folder.

The NLP tasks for user preference profiling can be performed asynchronously and continuously after the events. When a user preference profile is updated (such as adjustment of confidence levels, normalization of terms, addition or removal of interests and expertise) which may take place asynchronously after the events, it is important to maintain the valid times for the records in a user preference profile according to the user creation date, user last modification date, sent time, delivered time, conference session times, etc. associated with the artifacts. Social network analysis for idea dissemination or influence networks among users can be conducted by analyzing the changes in the interest and expertise profiles of the users in relation to each other in the valid time in the real world. To enable effective analysis, it is important to maintain the valid user times in the user profiles to capture how the user profiles evolve in relation to each other.

FIG. 1 illustrates a subset of all events, user related events 105, that are performed by a given user. The system 100 is also aware of the user's environment, which may include such things as the time, date, geographic location, and so on. The system 100 is typically divided up into workspaces that are each associated with a specific project or functional area. Users are granted access to those workspaces within their area of responsibility. Thus, users in a workspace may wish to be notified when an event occurs in a workspace to which they belong. In some embodiments, complex expressions are generated that can combine the conditions of enterprise preferences, user preferences, group preferences, classifications of each preference value (interest, expertise, like, dislike, recommendations, etc.), contents, topics to detect events.

The system 100 stores user preferences in a preference table 110 that can be stored in a temporal database. In typical content management systems, a system administrator or user explicitly populates the preference table using an explicit setting interface 120. User preferences are recorded using preference key, value pairs. Some preference values can change depending on user's present context. To address this difference in preferences depending on user context, the preferences are organized according to profiles, with a profile corresponding to a given instance of user preference values.

For the user shown in FIG. 1, the user preferences indicate that when the user is in the "Work" profile, she has an interest in "SPARC T-Series", is interested in a particular product workspace "Exadata Machine", and is located in the Pacific time zone. When the user is in the "Vacation" profile, she "dislikes" (is not interested in) SPARC T-Series Exadata Machine product information. The user's preference table 110 also indicates that when she is at the Fall Conference she is located in the Eastern time zone. The user has been designated as an "expert" in SPARC T-Series, either by herself or the system, as will be described in more detail below.

The system 100 includes policies on how the information in the preference table is applied to system behavior. For example, the system may have a policy that specifies that meetings are to be scheduled between 9:00 AM and 4:00 PM in the user's time zone. The system may have a policy specifying that when a user is "interested" in a workspace any modification to an entity in the workspace results in notification for the user, while when a user "dislikes" the workspace, no notifications are sent to the user. Sometimes policies can override user preferences. For example, if the user is designated an expert in a certain area (SPARC T-Series), the policy may specify that the user receives certain urgent notifications even if the user has communicated a desire (e.g., is in vacation profile) not to be notified. Thus, being designated as an expert may result in an "implicit subscription" to events related to a user's area of expertise.

In one embodiment, the system 100 parameterizes policies by binding variables to policy constants at runtime (at event processing time). This allows the policy author to bind the variables of the policies to the constants from appropriate preference values. Some examples of preferences that can be used by policies are the quota for storage utilization, the quota for notification messages, the retention period for record management, and the preferred language and locale of a workspace.

Policies influence the creation and usage of user preferences. For example, as part of the user's notification preferences, the user can specify a list of delivery channels in the order of preference. If the user's first preferred delivery channel is push mail, at runtime the system retrieves the user's preference from the stored preference information and provides a notification of an event via push mail. However, if the user's quota of push mail has been exceeded, the policy may specify that the system retrieve the user's second preferred delivery channel and provide a notification via that channel.

Through policy observers (not shown), the system 100 captures the one-to-many dependency between entities so that when a specified trigger condition is activated in the source entity, all the dependent entities are notified automatically. The dependent entities are policy instances. The number or types of policies do not need to be coded into the trigger points of the source entity. Any number of policies can be configured to observe the trigger points in any entity to inject the business rules. The trigger point in the source entity can invoke the dependent policies directly. Alternatively, the source entity can raise the event and let an intermediary feed the events to the dependent policies. The latter approach supports loose coupling between the source entity and dependent policies.

In general, policies can affect the lifecycles of the workspaces, folders, documents, discussion forums, wallpapers, wiki pages, conferences, messages, calendars, tasks, and journals that the user can create, share, coordinate, and communicate with each other. The policies influence how the users detect each other's presence or receive messages via pervasive devices.

There are specialized subclasses of policy, such as a User Profiling Policy, a Privacy Policy, an Expert Selection Policy, a Record Management Policy, a Message Control Policy, a User Provisioning Policy, a Notification Policy, an Email Preference Policy, a Conference Preference Policy, a Time Management Preference Policy, a Notification Preference Policy, to name a few. Each of these specialized policies can be formulated in terms of workflows, forward-chaining systems (rete, rule-based), backward chaining systems (prolog or datalog), Complex Event Processing (CEP), and Continuous Query Language (CQL) which are a few of the commonly used inference strategies. Strategy classifies the policy statements by the grammar of the language and execution models. For example, an instance of the Rule Based Strategy contains the rule sets, fact types, condition templates, and action templates defining a rule-based application. A Workflow Strategy is a different schema for specifying the temporal sequences of processes. The workflow schema is different from the schema of a rule-based production system. A complex policy may employ multiple rule-based strategies and workflow strategies, with rule actions starting workflows and workflow actions evaluating rule-based strategies.

The declarative languages of a rule-based strategy offer the ability to formulate expressions. There are two levels of knowledge bases in a rule-based strategy; one level is composed of long term memory components called rule bases and another level is composed of short term memory components called fact bases. For rule based strategies, the users can define the rules in "IF (condition) THEN {action}" constructs much like in procedural languages. However, the condition part of the rule specifies the pattern matching expressions among facts that are processed by specialized algorithms, two of which, the rete networks and the database expression filters, are commonly in use.

The rule sets for the rule-based strategies comprise the long-term memory components of the system, whereas the rule-like instructions such as a Message Control Instruction and a Record Management Instruction can be asserted into the fact bases of the strategy. The following rule definition (in Oracle rule language) is one of the rules in the rule bases of the Notification Policy, and as such, it is part of the long-term memory component of the rule-based strategy. The condition part of the rule defines the pattern matching expressions between the user's notification subscription facts and the event facts.

```
rule NotificationRule {
    if (fact NotificationSubscription sub &&
    fact Event event &&
    EvalCondition(sub.condition, event)) {
        DoAction(sub.action, event);
    }
}
```

In the above rule definition, the if-clause defines the rule condition. This rule construct allows evaluation of the rule conditions and rule actions contained in the NotificationSubscription object. The rule engine's built-in function EvalCondition will interpret the RuleCondition object of the NotificationSubscription. When the subscription matches the event properties, then the RuleAction object of the NotificationSubscription will be invoked via another rule engine built-in function DoAction. In both cases, the Event object is passed to the callback classes of the condition and action objects. The above example also shows how the business objects can be used in the definition of the rule base of the strategies.

Such a rule based pattern is necessary in order for the rule engines, which employ the rete networks, to support hundreds of thousands of rule-like instructions specified by the users. The fact base that contains facts like NotificationSubscription is referred to as short term memory component because the facts can be added and retracted dynamically. It does not mean that notification subscriptions are transient objects. For example, when the users disable their subscriptions, the corresponding NotificationSubscription facts should be promptly retracted from the fact base. The notification subscription objects are persistent objects and so they can be asserted into the fact base on demand when the Event arrives. Using a rule expression, the following describes how the NotificationSubscriptions can be retrieved from the persistent storage and fed into the fact base on demand.

```
rule NeedNotificationSubscriptions {
    if (fact Event event) {
        loadNotificationSubscriptions(event.source,
            event.type);
    }
}
```

The built-in function loadNotificationSubscriptions( ) loads all NotificationSubscriptions that have the matching source and type. The system can create or update an observer instance on demand when the user submits a new NotificationSubscription. A similar rule base pattern is also supported by database expression filters. To define the same type of rule base using expression filters, a table is defined that contains a column of expression type for the rule condition and another column for rule action. The filter expressions in the RuleCondition follow the SQL where clause syntax that can refer to the parameters in the attribute set.

```
CREATE TABLE NotificationSubscription (
    Subscriber User,
    RuleCondition VARCHAR2(200),
    RuleAction VARCHAR2(40));
```

After defining the NotificationSubscription table, the following function can be used in the dbms_expfil package to declare that the filter expressions in the RuleCondition will be matched against the attribute sets in the Event objects.

```
begin
    dbms_expfil.assign_attribute_set(attr_set => 'Event',
        expr_tab => NotificationSubscription,
        expr_col => 'RuleCondition');
end;
```

The Event object type is defined as follows:

```
CREATE OR REPLACE TYPE Event AS OBJECT (
    SourceScope Scope,
    Source Entity,
    Type EventType,
    ActionDoer Actor
);
```

The following function can be used in the dbms_expfil package to declare Event objects as the attribute sets for the expression filter.

```
begin
    dbms_expfil.create_attribute_set(attr_set => 'Event',
        from_type => 'YES');
end;
```

Pattern matching is performed when the rule actions are selected for the expression filters that match the attributes of the Event as shown below.

```
SELECT User, RuleAction
FROM NotificationSubscription
WHERE EVALUATE (RuleCondition,
    Event.withData(data)) = 1;
```

The user's notification subscriptions are persisted in the NotificationSubscription table. The table can include additional columns, such as the preferred delivery channels and enable or disable states which are part of the NotificationSubscription. Depending on the implementation, the RuleAction column may be omitted if "DoNotify" is the only type of action. However, in general the actions may be individualized.

The system 100 may employ the policy observers' metadata to register policies to be notified of the events from the specified trigger points in the source entity. Triggers are well known conditions that are stimuli for events whereas policies define the conditions and actions of the Event-Condition-Action (ECA) scheme. When the trigger fires, an event is dispatched to the associated policy, which will evaluate the event and activate the resulting actions. Below, {EventType} denotes an unordered set of event types and <Policy> denotes an ordered set of policy objects.

```
PolicyObservers =>
    Description : richtext,
    Source : Entity,
    EventTypes : {EventType},
    Observers : < Policy>,
    Expiration : timestamp
```

Each of the policies can inject various plans of actions, such as audit, record management, workflow, message filtering, notification, etc. The observers will become inactive after the expiration time.

In addition to simple inserts and deletes in a message system, events can be defined broadly as a state change in data, or even as the absence of an occurrence of some expected change in data. In other embodiments, events may be generated synchronously or asynchronously from database select, insert, update, and delete operations. Events may further include various timer events and non-occurrence of expected events (such as timeouts).

In some embodiments, events are generated from the well-known trigger conditions in an entity. This means that each entity would need to define its set of trigger points. In such embodiments, these trigger points may be buried in the code so that appropriate actions can be taken at the appropriate times that could alter the course of an operation on the entity.

In some embodiments, events may be detected by a native language associated with event data, e.g., SQL for relational data, SQL valid time flashback query for bi-temporal data, etc. . . . . The actions that are performed as a result of the occurrence of the events may be specified in a language associated with a content management system. This approach leverages the full power of the underlying language.

Events may be refined or classified using contextual information from preference profiles, conditions, and natural language information extraction. Some events may be composed of hierarchies of composite and simple events with explicit or implicit causal relations among events. For example, an expert selection event may be composed of a set of user profile update events which in turn may be composed of a set of artifact update events, with causal relations from lower level component events to higher level composite events. Some of these relations may be complex and require complex event processing (CEP) capability.

In addition to the explicit setting interface 120, the embodiment shown in FIG. 1 includes an event processing logic 130 that monitors the user related environment and events (and the artifacts associated with the events) to extract user information that can be used to automatically populate the preference table 110 without explicit user instruction. The event processing logic 130 may include a natural language processor (not shown) that parses artifacts associated with the user related events 105 to extract noun phrases that may correspond to a topic of the artifact. For example, as described above, NLP tools can normalize topics from a set of terms by confidence levels. The event processing logic 130 may also include a named entity recognition (NER) processor that identifies character patterns such as dates and phone numbers.

A preference extraction logic 150 extracts preferences from the user information extracted (e.g., noun phrases describing the topic of the user related artifacts) by the event processing logic 130 from the user related events. For example, if the event processing logic 130 determines that the user has opened a number of documents that all have a certain topic while in a work profile, then the preference extraction logic 150 may infer that the user is interested in the topic. A preference logic 140 will then populate the preference table 110 with a row corresponding to profile "Work", preference key "Interest", and preference value "Exadata Machine". Any subsequent processing of events according to a policy for the "Interest" preference key will be performed in light of the user's preference for the topic. The preference extraction logic 150 may parse a user's meeting invitations and over time determine that the user appears to prefer to meet in the morning. The preference logic 140 populates the preference table with a row corresponding to profile "Work", preference key "Preferred Meeting Time", and preference value "Morning".

The preference extraction logic 150 may have various criteria for determining whether a user is interested in a topic such as a threshold number of events related to a topic. The preference extraction logic 150 may also deduce that a user is an expert based on other, more stringent criteria. In another example, the preference extraction logic may parse an "out of office" notice from the user for a Fall Conference in the east coast time zone. The preference extraction logic may create a new row indicating a preference for meeting times in the morning in the east coast time zone during the Fall Conference.

The preference extraction logic 150 may attach a confidence level to a topic that is a preference value in the preference table 110 based on the confidence with which the preference extraction logic 150 extracted the topic from the user related events 105. This confidence level may be stored in the preference table 110 for use by a subscription logic (see FIG. 2) that filters events and triggers notifications to users based on preference values in the users' preference tables. A confidence level of 100 percent may be assigned to preference values that were explicitly set by the user or a system administrator.

The event processing logic 130 also may include a context extraction logic 170 that extracts a user's present context from user related events. The context extraction logic 170 provides the extracted context to a profile selection logic 160 that selects an active profile corresponding to the extracted context. For example, the context extraction logic 160 may parse an "out of office" notice for the user that states that the user is on vacation and automatically select the vacation profile.

Policies can be developed to properly deal with preferences, explicit and implicit. For example, if a user has three topics of interest, a policy may state that if the user is in a work profile, a disjunctive combination of the topics will generate a notification, while if the user is in a vacation profile, only a conjunctive combination of the topics will generate a notification. A policy that handles events differently according to whether they occur during business hours may look to a user's active profile to deduce a time zone in which the user is present.

Figure 2:
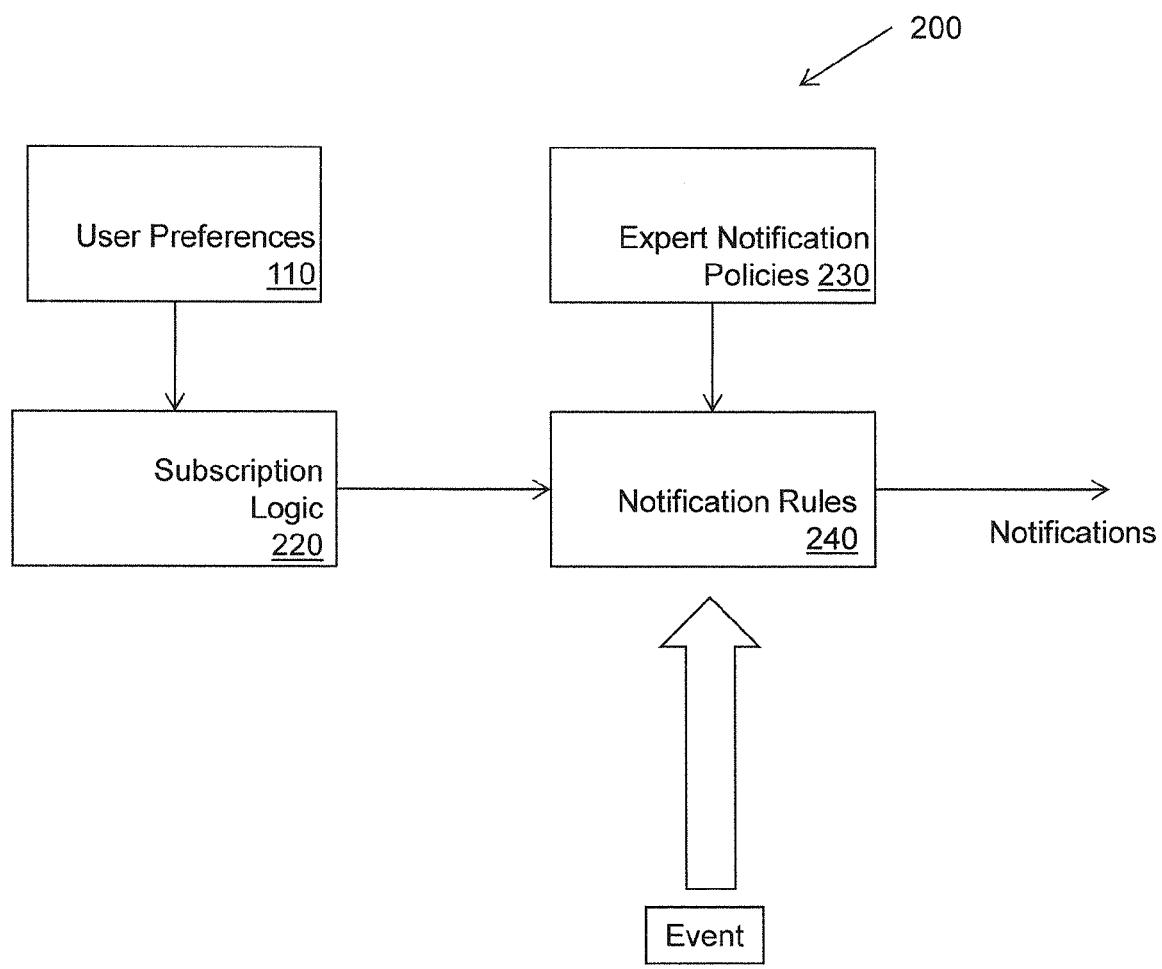
FIG. 2 illustrates another embodiment of a system associated with event processing.

FIG. 2 illustrates one embodiment of a system 200 that provides notifications of events to users. The system 200 includes one or more notification rules 240 that are processed to provide notification to user as discussed above. The notification rules 240 can be created using a subscription logic 220 in which a user or administrator explicitly crafts notification rules to subscribe the user to event notifications.

The subscription logic 220 may also create notification rules without user intervention. For example, when a new topic is added to a user's preferences as an "interest", the subscription logic 220 creates a rule that subscribes the user to notifications of events related to the topic. In some instances, a new rule does not need to be created per se, because there may already be a rule that sends notifications to users having an "interest" in the event. Expert notification policies 230 also contribute notification rules 240 that are based on an enterprise's expert policy. Notification rules associated with expert notification policies may override a user's preference in situations in which the filter conditions are met.

The subscription logic 220 may create additional rules for use in processing notifications for preference values that have been extracted from the user's related artifacts. For example, the subscription logic may ask the user if they want a subscription when a preference value has been extracted for the user. The rules may also specify various notification filter conditions that are based on the confidence associated with an extracted preference value. For example, a notification filter condition may hold that if a term in a preference table was extracted with a high confidence level (e.g., a confidence of greater than 69%), a new document that contains a single matching term results in a notification while a term with a lower confidence level (e.g., less than 70%) requires multiple matching terms to result in a notification.

Figure 3:
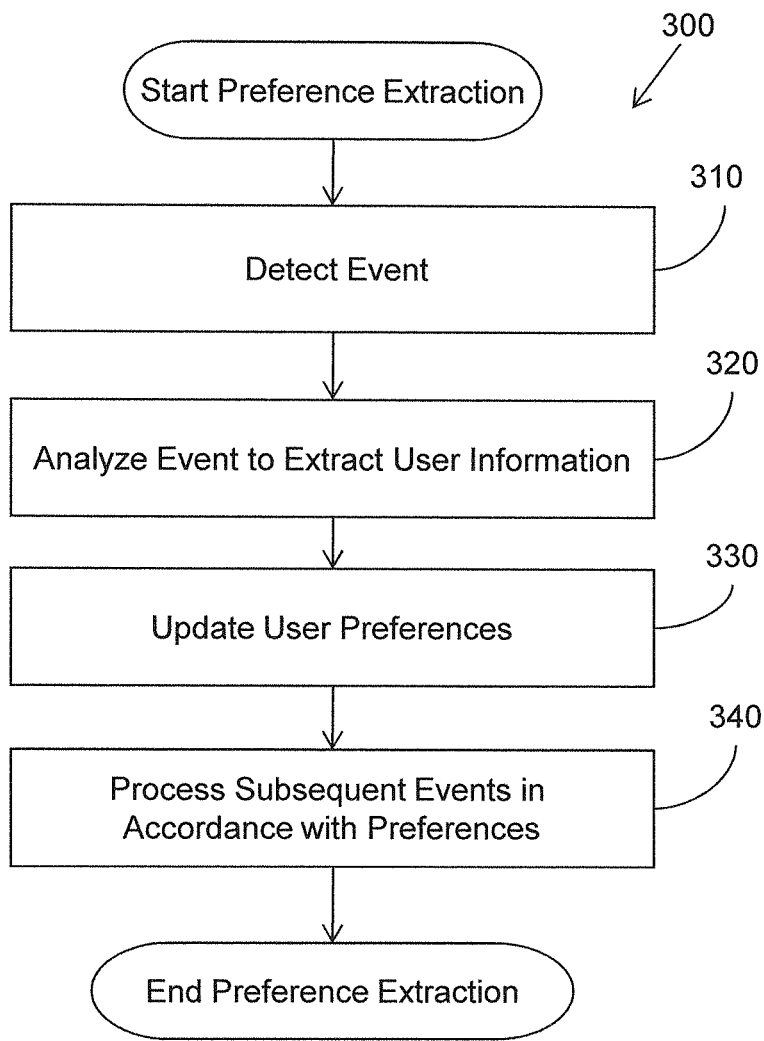
FIG. 3 illustrates one embodiment of a method associated with event processing.

FIG. 3 illustrates one embodiment of a method 300 associated with event processing. At 310 the method includes detecting an event in a content management system, where the event is associated with a user and is not an instruction by the user to specify content management actions to be performed in response to future events. At 320, the event is analyzed to extract information about the user. NLP, NER, or any other suitable technique may be used to extract the information (e.g., topic of an artifact related to the user). At 330, the user's preferences are updated based on the extracted information. At 340, the method includes processing a subsequent event in accordance with the extracted information about the user.

In some embodiments the method 300 includes analyzing an artifact associated with the user (e.g., created or accessed by the user) to determine one or more topics of the artifact. The user's preference table may be updated to indicate that the user has an association with the topic. For example, the association with the topic may be interest in the topic, an expert status with respect to the topic, a recommendation for the topic, and so on. The association may be recorded in the preference table 110 (FIG. 1) as a preference key. The user may be subscribed to notifications about events related to the one or more extracted topics. In some embodiments, the method 300 includes determining an active profile, for the user and processing notification subscriptions for the user based on the active profile.

Figure 4:
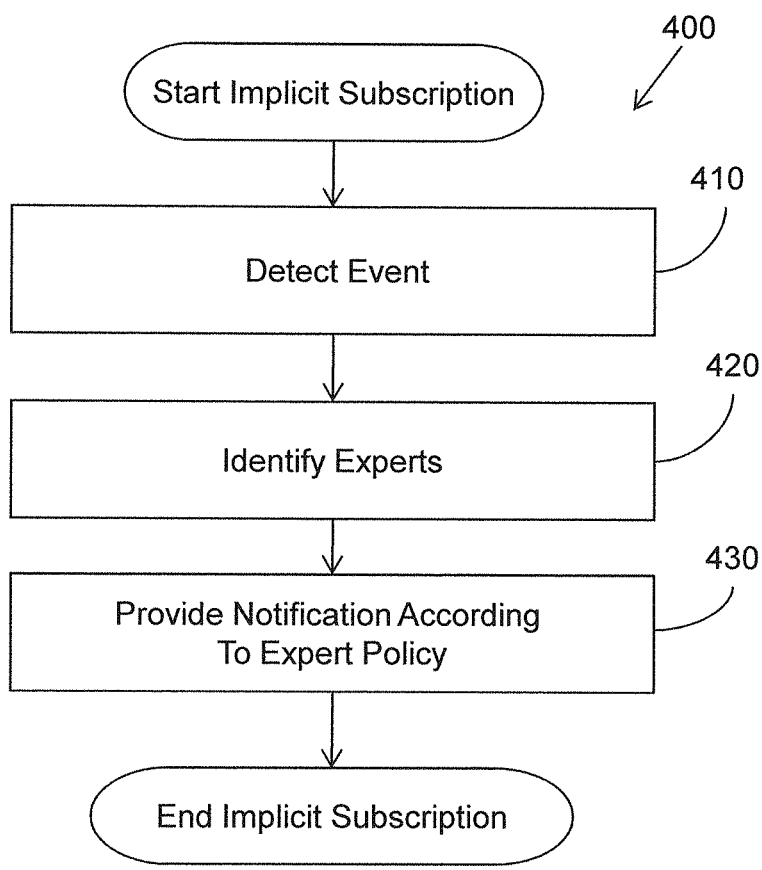
FIG. 4 illustrates an embodiment of a method associated with event processing.

FIG. 4 illustrates one embodiment of a method 400 associated with generating implicit subscriptions to events based on a user's expert status. At 410 the method includes detecting an event that meets notification rules requiring notification to at least one expert. At 420, users that have been designated expert for a topic related to the event are identified. This may be accomplished by analyzing user preference tables (see FIG. 1) to locate a user that has an expert designation. At 430, the method includes notifying the identified expert about the event according to a notification policy. This notification may occur without an explicit request by the user for the notification, but rather as an implicit subscription based on the user's expert status.

Figure 5:
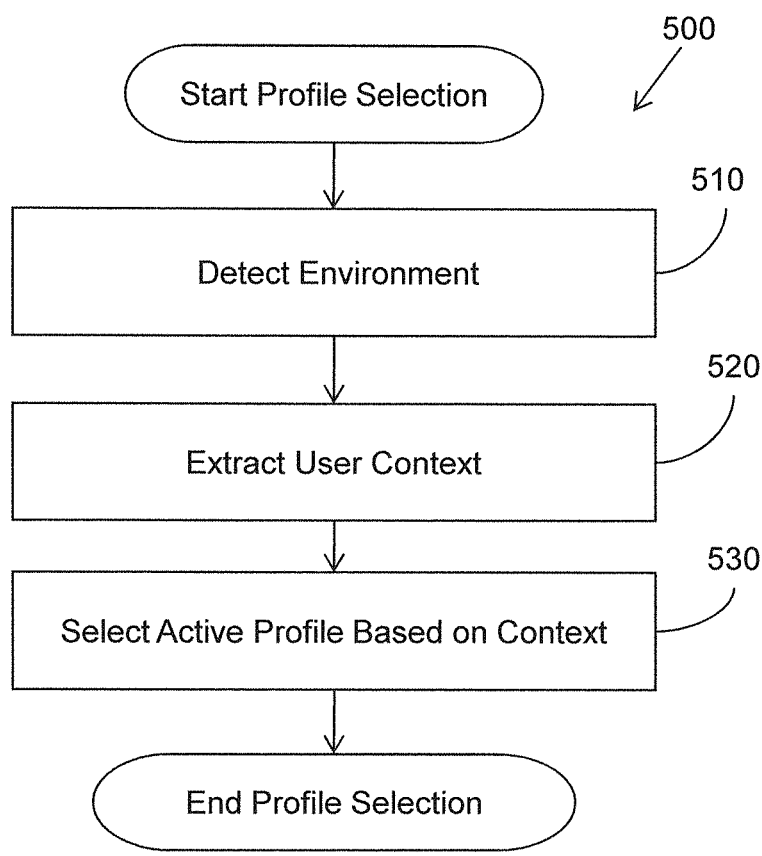
FIG. 5 illustrates another embodiment of a method associated with event processing.

FIG. 5 illustrates one embodiment of a method 500 associated with setting an active profile based on a user's context. At 510 the method includes detecting an environment associated with a user. At 520, the environment is analyzed to extract context information about the user. At 530, the method includes selecting an active profile for the user based on the context information. For example, in the preference table 110 shown in FIG. 1, there is an entry for a "quiet" profile in which notifications pertaining to the Exadata Machine are blocked. This profile may be selected according to a company policy that blocks internal notifications just prior to an SEC report about the Exadata Machine.

Figure 6:
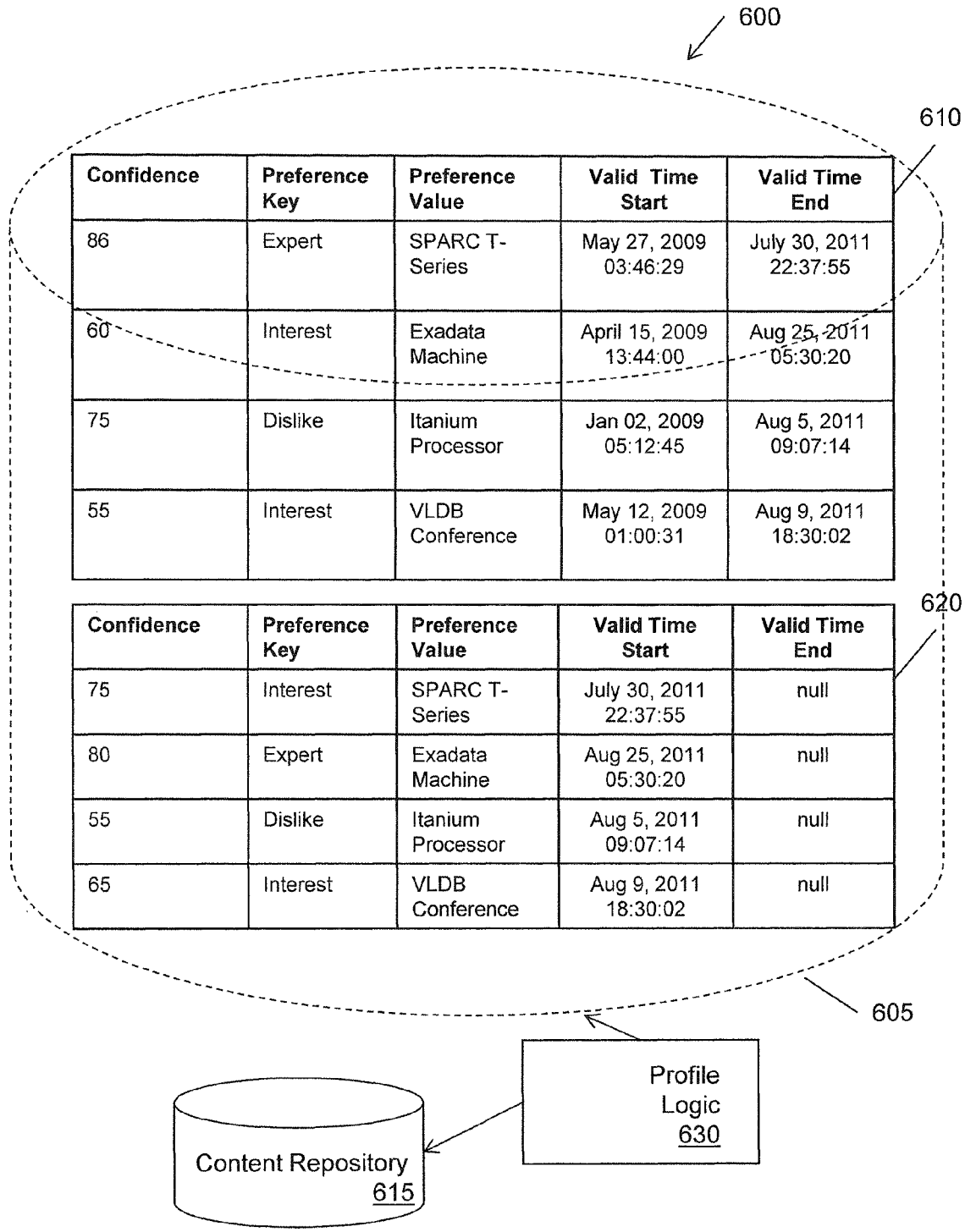
FIG. 6 illustrates another embodiment of a system associated with event processing.

Referring to FIG. 6, one embodiment of a bi-temporal user profile system 600 is illustrated. The system 600 may be implemented using a bi-temporal database system that provides valid user time and transaction time capability. The system 600 includes, a profile repository 605 configured to store profile data describing one or more user profiles. Each user profile specifies topics of interest to the user. Fragments of two versions of the same user's profiles are shown for illustrative purposes: a prior user profile 610 which was updated on or before May 27, 2009 and a subsequent user profile 620 that was created on or after Jul. 30, 2011. While two sets of historical records of user profiles 610, 620 are shown, any number of records may be stored for any number of user profiles for any given user, and each record may have any number of historical versions, each of which is tagged by a non-overlapping period of valid user time.

As can be seen in FIG. 6, each row or version of a user profile record is tagged by a valid time period between "valid time start" and "valid time end" dates. The valid time start and end times can be derived from the user creation time or user last modification times of the artifacts that trigger the changes to the user profile record.

The user profiles 610, 620 in FIG. 6 may be projections of a user profile view that includes valid user time periods. This user profile view may be derived from four base tables that are created using the following Oracle database data definition language (DDL) statements:

```
"CREATE TABLE user_profile
    (user_id NUMBER,
    profile_id NUMBER,
    preference_key_id NUMBER,
    preference_value_id NUMBER,
    confidence_NUMBER,
    valid_time_start DATE,
    valid_time_end DATE,
    PERIOD FOR user_time(valid_time_start, valid_time_end)
  CONSTRAINT pk1 PRIMARY KEY(user_id, profile_id,
  preference_key_id, preference_value_id, user_time)
  CONSTRAINT fk1 FOREIGN KEY(profile_id)
  REFERENCES profile(profile_id)
  CONSTRAINT fk2 FOREIGN KEY (preference_key_id)
  REFERENCES preference_key(preference_key_id)
  CONSTRAINT fk3 FOREGIN KEY(preference_value_id)
  REFERENCES preference_value(preference_value_id) );"
"CREATE TABLE profile
    (profile_id NUMBER,
    profile_name VARCHAR2(80)
```

```
PRIMARY KEY profile_id;"
"CREATE TABLE preference_key
    (preference_key id NUMBER,
    preference key VARCHAR2(80)
    PRIMARY KEY preference_key_id;"
"CREATE TABLE preference_value
    (preference_value_id NUMBER
    preference_value VARCHAR2(4000)
    PRIMARY KEY preference_value_id."
```

The historical user profile records can be queried using the SQL SELECT with temporal clauses: "AS OF PERIOD user_time:aTime" or "VERSIONS PERIOD user_time BETWEEN:start_time AND:end_time" where the times are specified in valid time (a user time as opposed to the transaction time).

The system 600 also includes a content repository 615 that stores the user generated contents and that generates various events when contents are updated or user interactions occur in various collaboration activities. A profile logic 630 is in communication with the content repository 615 and the profile repository 605. The profile logic 630 creates updated profiles and stores them in the profile repository. To accomplish this, the profile logic 630 is configured to detect an event that occurred at a valid event time (as opposed to the transaction time of the content repository). In response to the event, the profile logic 630 accesses the profile repository 605 and retrieves a prior user profile record from the profile repository. The prior user profile record may have a profile valid period corresponding to an earlier time that is prior to the valid event time. The profile logic 630 generates an updated user profile record based, at least in part, on the event and stores the updated user profile record in the profile repository.

By way of illustration, the following explanation is provided to describe one way in which a temporal database system may maintain the historical records using the valid times. When the profile logic 630 updates a record in a user profile, the updated user profile will include two records corresponding to two non-overlapping valid time periods that are divided by the valid event time. The prior user profile record (corresponding to the prior valid time period) is updated with the valid time end set to the valid event time. A new user profile record is created with a valid time start set to the valid event time and valid time end set to the previous valid time end of the prior user profile record. If the valid time end of a user profile record is null, it indicates that the record is the latest version in the user profile and is valid into the future until a subsequent update that may happen for a future valid time.

In the embodiment shown in FIG. 6, the profile data includes a confidence level associated with each preference key, value pair. This optional data provides an indication of the certainty with which the given preference has been established by the automatic preference extraction techniques described above. For example, in the prior user profile 610 "VLDB Conference" has been designated as a topic of "interest" to the user with a confidence of 55 percent. In the updated user profile 620, the confidence associated with the deduction that "VLDB Conference" is a topic of interest to the user has been increased to 65 percent. This may be due to one or more events that indicate that the user is interested in the database conference. For example, the user may have sent and/or received a number of e mails whose topic was derived to be "VLDB Conference" or drafted a meeting agenda that included an item for "VLDB Conference."

The evolution of the user's interests can be tracked by comparing the prior user profile 610 and the updated user profile 620. For example, user profile 610 shows that the user is an expert in SPARC T-Series. In user profile 620, it can be seen that the user is no longer an expert in SPARC T-Series. This expert status may have been explicitly removed, perhaps by the retraction (explicit retroactive deletion) of a document in the content repository 615 using a bi-temporal update operation, or by lack of events relating the user to SPARC T-Series over some pre-determined period of time. The user has been deemed an expert in Exadata Machine in the updated user profile 620 while in the prior profile 610 he was merely interested in Exadata Machine. The user profile 620 continues to designate the topic "Itanium Processor" as a topic of dislike, and with lower confidence.

In some instances, the detection of the event by the profile logic occurs at a transaction time subsequent to the valid event time but the profile includes valid time periods derived from the valid event time rather than the transaction time. For example, a user's profile may be updated based on the user's presentation of a topic in a conference at time $t_1$, but the system 600 may not detect an event for the presentation until a transcript of the presentation is uploaded to the content repository 615 at time $t_0$. The profile of the user was then updated to reflect an interest in the topic of the presentation at the valid time $t_1$. When the profile system 600 detects at $t_0$ the presentation event that occurred at $t_{-1}$, the system 600 may then more accurately draw influence links between the presentation and other users' evolving interests. Interest changes in the topic in other users' profiles may take place after the valid time $t_{-1}$ but may have been updated in profile repository 605 prior to the detection of the presentation event at time $t_0$. The profile logic 630 can determine how much influence the presentation had on other users' interests by querying the profile repository 605 for the number of profiles that were updated after valid time $t_{-1}$ to show an increased interest in the topic following the presentation.

In some embodiments, the profile logic 630 is configured to derive a user profile based on event data for events that occurred prior to a specified time and to store data describing the derived user profile and having a profile record valid time period corresponding to the specified valid event time. For example, an archive of documents corresponding to events prior to May 27, 2009 may be added to the content repository 615 in late 2011. The recovered events for these documents may indicate that the user was an "expert" in SPARC T-Series. A prior user profile record may be added to user profile 610 to reflect this expert status as of May 27, 2009 and consequently adjusting the confidence level in the user's most up-to-date profile record as of Jul. 30, 2011.

There is no change to the valid time period of the most up-to-date profile record for SPARC T-Series. This update to a historical record for a valid time may be transparently tracked by additional historical records in a Flashback Data Archive. The historical records in the Flashback Data Archive are tagged by transaction times rather than valid times. These historical records are immutable and are automatically purged from the Flashback Data Archive after a retention period. The valid time and transaction time historical records can be combined in bi-temporal queries to provide provenance information. See FIG. 8 for a more detailed explanation of how queries may be processed by the system 600.

Figure 7:
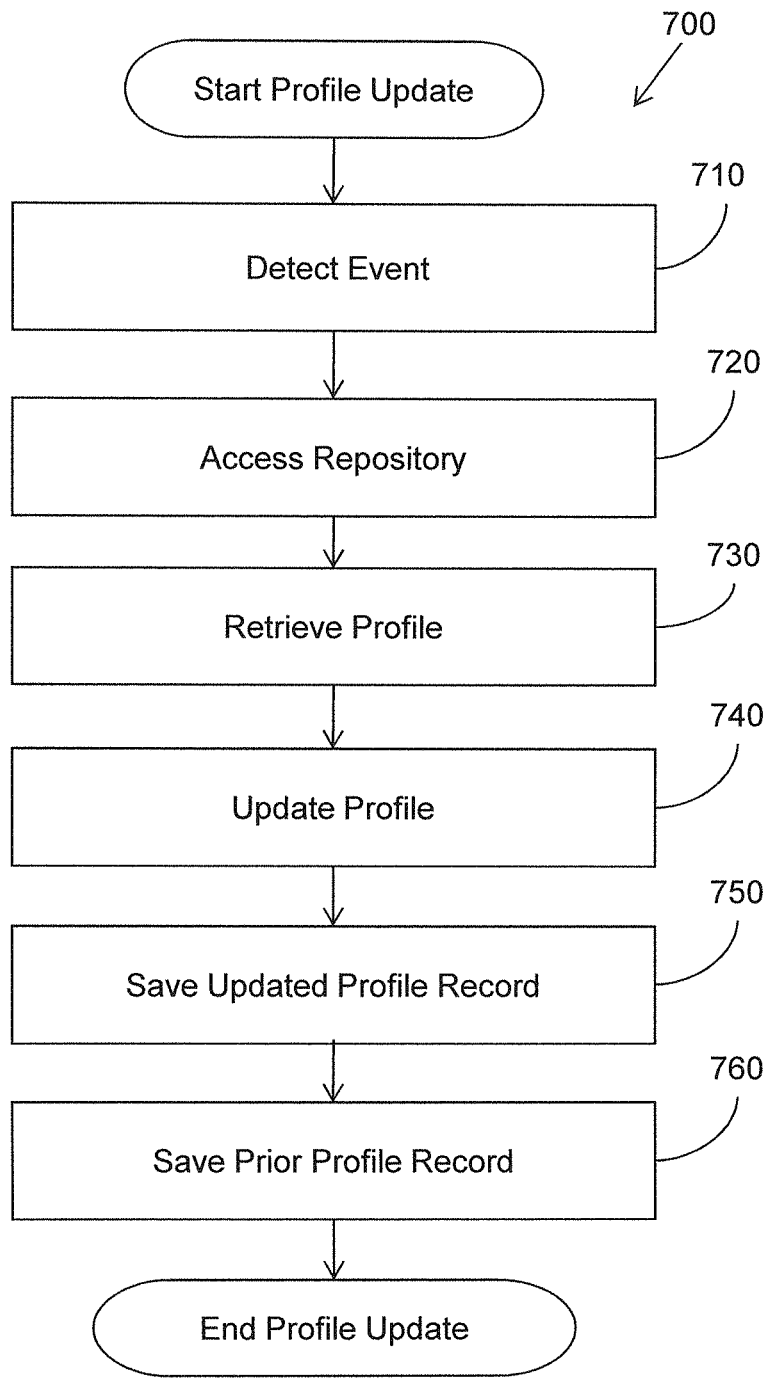
FIG. 7 illustrates one embodiment of a method associated with event processing.

FIG. 7 illustrates one embodiment of a method for performing bi-temporal user profiling 700. At 710, the method includes detecting an event that occurs at a valid event time. At 720, the method includes, in response to the event, accessing a repository storing data describing one or more user profile records that include a profile record valid time period specified by a valid time start and a valid time end between which the given profile record is valid in the real world. At 730, the method includes retrieving a prior user profile record having a valid time period corresponding to an earlier time that is prior to the valid event time. At 740, the method includes generating an updated user profile record based, at least in part, on the event. At 750, the method includes saving the updated user profile record with the valid event time as a profile record valid time start. At 760, the method includes saving the prior user profile record including the valid time period corresponding to the earlier time, with valid time end set to the valid event time, for historical record keeping.

Figure 8:
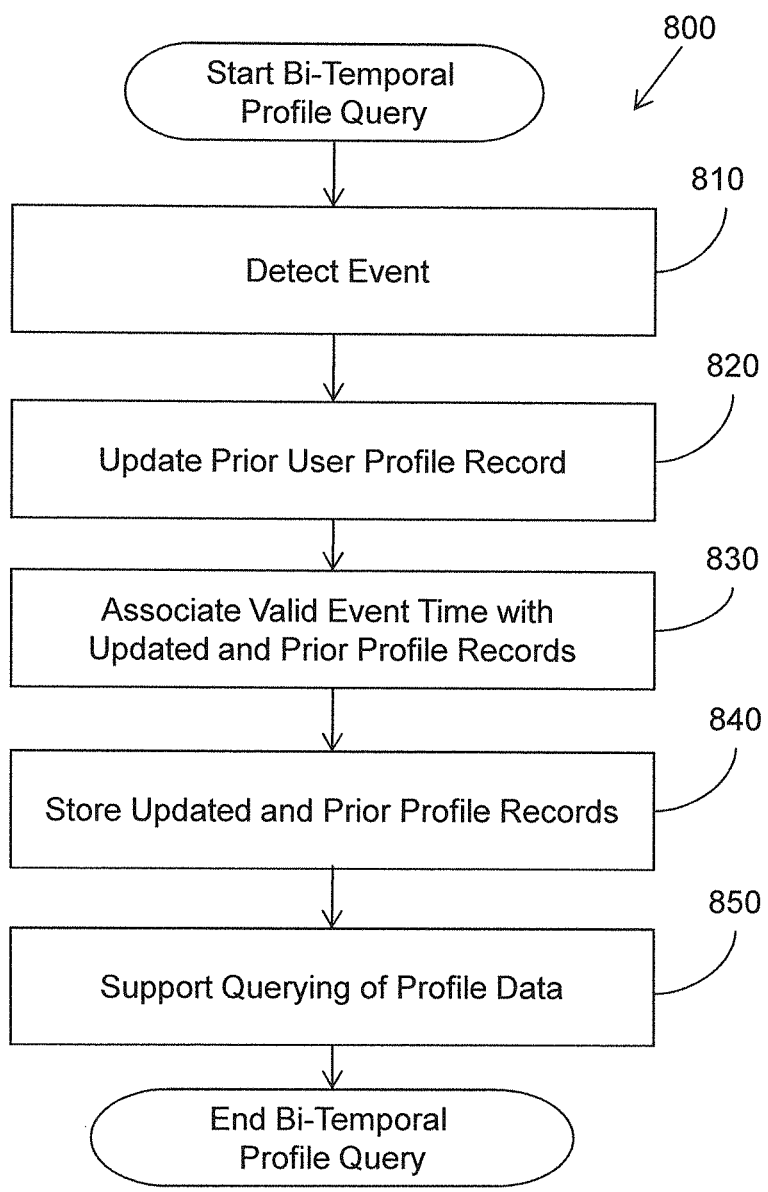
FIG. 8 illustrates an embodiment of a method associated with event processing.

FIG. 8 illustrates one embodiment of a method 800 for querying bi-temporal profile data. At 810, the method includes, at a system or transaction time, detecting an event that occurred at an earlier or later valid event time. At 820, the method includes updating a prior user profile record based, at least in part, on the event to create an updated profile record. At 830, the method includes associating the valid event time with the updated profile record. At 840, the method includes storing the updated user profile record and the prior user profile record in a profile repository. At 850, the method includes processing queries on user profiles stored in the profile repository based on the valid time periods associated with the user profile records which are valid for a time in the real world.

In one embodiment, the method includes querying the repository of user profiles to return user profile records having a valid time period overlapping with a specified valid event time period or a valid time matching a specific valid event time. A user profile record may describe a level of expertise the user has with respect to a topic of interest. For example, if a question arises about a product that was discontinued three years ago, no personnel may presently be deemed to be an expert on the product. To locate an appropriate person to address the question, the profile repository may be queried for experts on the product based on profile valid times that are a few years old.

To further illustrate the concept of querying bi-temporal profile records, the following examples are provided that refer to the bi-temporal data of the user profiles 610 and 620 in FIG. 6. The following example SQL valid time flashback queries and valid time updates can be applied to the bi-temporal data in "User_A profile" tables 610, 620.

The following valid time flashback query:

```
SELECT Confidence, Preference_key, Preference_value
    FROM UserA_profile
        AS OF PERIOD user_time '2009 June 1';
``` will return the following four rows:
(86, Expert, SPARC T-SERIES)
(60, Interest, Exadata Machine)
(75, Dislike, Itanium Processor)
(55, Interest, VLDB Conference).
that provide snapshots of the historical profile records as of a specified valid time.

The following valid time flashback query:

```
SELECT Confidence, Preference_key, Preference_value
    FROM UserA_profile
        VERSIONS PERIOD user_time
            BETWEEN '2011 July 1' AND '2011 Aug 31'
        WHERE Preference_value like 'SPARC T-SERIES';
``` will return the following two rows:
(86, Expert, SPARC T-SERIES, 2011 Jul. 1, 2011 Jul. 30)
(75, Interest, SPARC T-SERIES, 2011 Jul. 30, 2011 Aug. 31)
that indicate that there are 2 versions of profile records for SPARC T-SERIES in a specified valid time period.

The following valid time flashback query:

```
SELECT Preference_value, count(DISTINCT Preference_key) − 1
    FROM UserA_profile
        VERSIONS PERIOD user_time
            BETWEEN '2011 July 1' AND '2011 Aug 31'
        GROUP BY Preference_value;
``` will return the following four rows:
(SPARC T-SERIES, 1)
(Exadata Machine, 1)
(Itanium Processor, 0)
(VLDB Conference, 0)
that indicate the number of state changes for the preference_key for each preference_value in a specified valid time period.

The following SQL valid time update statement:

```
UPDATE UserA_profile
    PORTION OF user_time
        BETWEEN 'May 27, 2009 03:46:29' AND 'July 30, 2011 22:37:55'
    SET Confidence = 86, Preference_key = 'Expert'
    WHERE Preference_value = 'SPARC T-SERIES'
``` can update a profile record for a portion of the valid time periods. The valid time update can be retroactive or predictive depending on the transaction time of the update operation relative to the timestamp "Jul. 30, 2011 22:37:55" specified for "valid time end".

The following bi-temporal flashback query:

```
SELECT Preference_value , count(Valid_time_start)
    FROM User_profile
        VERSIONS PERIOD user_time
            BETWEEN '2009 Jan 1' AND '2011 Aug 31'
        AS OF TIMESTAMP '2009 Jan 1'
    GROUP BY Preference_value;
``` will return the number of records that are created predictively (for a future valid time) by any database transactions that took place before 2009 Jan. 1. This scenario is contrasted with a more common scenario where the historical records are created retroactively.

In a typical event driven system, implemented by the event-condition-action system described in this specification, events pertain to the current state of the artifacts as the artifacts are created or updated. Some interesting event conditions need to be expressed in terms of the history of state changes in the artifacts and user profiles. For example analytic functions that involve aggregates and group-by operations are expressed over sequences of historical records as described in the SQL temporal queries above. The temporal database solution can discover complex events in a sequence of state changes in the artifacts and user profiles. The temporal database can augment an event-condition-action rule-based system with complex event processing capability.

Temporal logic notations described below can succinctly express complex event conditions over one or more sequences of historical records. The abstract temporal logic expressions can be translated to any number of query languages. It is important to propagate the valid times from the temporal sequences as valid event times in the complex events generated by the temporal logic expressions. A valid time or transaction time temporal sequence of data (e.g. versions of user profile records) can be denoted by $\phi$ and an instantaneous state of the data (e.g. a user profile record) by $(\phi,j)$, $j>0$. The state predicates are denoted p or $\neg p$ as consequences of the state $(\phi,j)$ by the following conditions:

$$(\phi,j) \vdash p \text{ or } (\phi,j) \vdash \neg p$$

The integer index j in the temporal logic notations selects an instantaneous state of a temporal sequence. Each discrete time step may denote one week, one day, one hour, etc., depending on the granularity used for the valid user times. If a granularity of one day is used for the time steps in the expressions, a user profile record (86, Expert, SPARC T-SERIES, 2011 Jul. 1, 2011 Jul. 30), which is valid for the valid time period between '2011 Jul. 1' and '2011 Jul. 30', will be processed as a subsequence comprised of 30 time steps. The step j provides a reference for deriving the valid event times for complex events. The following table defines temporal logic operators Next operator ○, Previous operator ●, Eventually operator ◊, Once in the Past operator ♦, Until operator U, and Since operator S.

| | | |
|---|---|---|
| $(\phi,j) \vdash \circ p$ | if and only if | $(\phi, j+1) \vdash p, j \geq 0$ |
| $(\phi,j) \vdash \bullet p$ | if and only if | $(\phi, j-1) \vdash p, j \geq 1$ |
| $(\phi,j) \vdash \Diamond p$ | if and only if | $(\phi, k) \vdash p$, for some k, $k \geq j$ |
| $(\phi,j) \vdash \blacklozenge p$ | if and only if | $(\phi, k) \vdash p$, for some k, $0 \leq k \leq j$ |
| $(\phi,j) \vdash p \, U \, q$ | if and only if | there exists a $k \geq j$, such that $(\phi, k) \vdash q$, and for every $i, j \leq i < k, (\phi, i) \vdash p$ |
| $(\phi,j) \vdash p \, S \, q$ | if and only if | there exists a k, $0 \leq k \leq j$, such that $(\phi, k) \vdash q$, and for every i, $k < i \leq j, (\phi, i) \vdash p$ |

The condition $(\phi,j) \vdash (\bullet \neg p_\wedge p), j \geq 1$, means that a state transition occurs at state $(\phi,j)$ which causes the predicate p to become true. A condition $(\phi,j) \neg \vdash q_\wedge \circ (q \, U \, t)$, means that on the next step, the predicate q begins to hold until predicate t becomes true (after a time interval has elapsed). When these two conditions are combined in $(\phi,j) \vdash (\bullet \neg p_\wedge p_\wedge \neg q) \rightarrow \circ (q \, U \, t)$, the predicate q can be used as a "throttle" to suppress (for an interval t) the generation of events that would have been generated by the condition $(\phi,j) \vdash (\bullet \neg p_\wedge p)$.

The condition $(\phi,j) \vdash (\blacklozenge p_\wedge q)$ means that the predicate p holds in some preceding step and predicate q holds at current step. The two predicates together can express a cause and effect pattern. Another condition $(\phi,j) \vdash u \, S \, v$, where predicate u recognizes a pattern in the sequence and the predicate v marks an event that precedes the pattern. In this condition, predicate u can detect a pattern, such as reaching the minimum and maximum inflexion points of a graph, since the last time step when predicate v is true. The condition $(\phi,j) \vdash (\blacklozenge p_\wedge q_\wedge u \, S \, v) \rightarrow \circ v$, which includes the composition of the two conditions $(\phi,j) \vdash (\blacklozenge p_\wedge q)$ and $(\phi,j) \vdash u \, S \, v$, can specify that after detecting the pattern in a state subsequence, in the next step, the predicate v is asserted to start the pattern detection again.

These abstract temporal logic expressions exemplify the complex event patterns, associated with valid event times, in temporal state sequences. These expressions can be translated to SQL valid time flashback queries. The detected complex events can be processed by an event-condition-action rule-based system.

Figure 9:
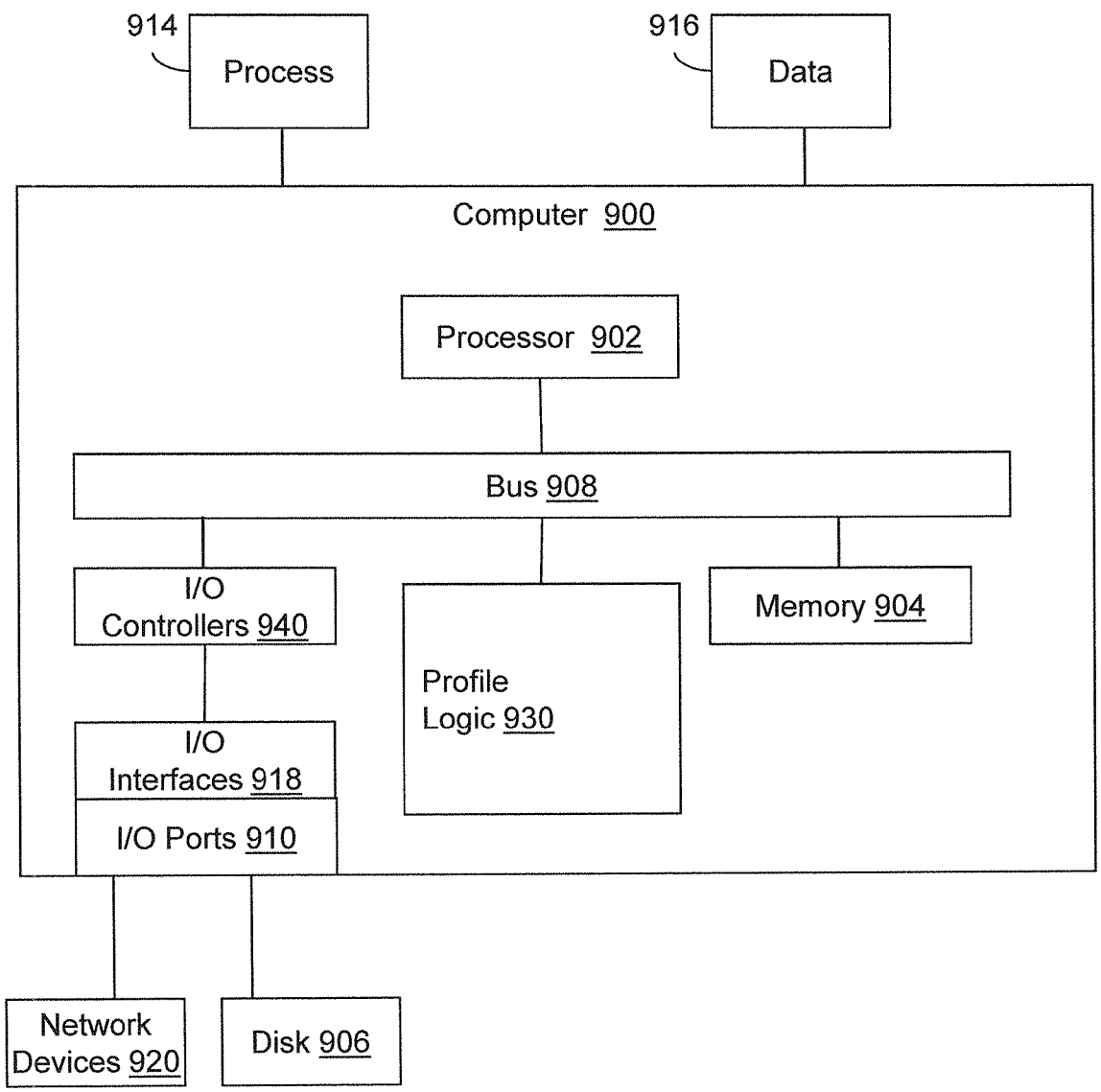
FIG. 9 illustrates an embodiment of a computing system in which example systems and methods, and equivalents, may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include an event processing logic 930 configured to facilitate event processing. In different examples, the profile logic 930 may be implemented in hardware, a non-transitory computer-readable medium with stored instructions, firmware, and/or combinations thereof. While the event processing logic 930 is illustrated as a hardware component attached to the bus 908, it is to be appreciated that in one example, the profile logic 930 could be implemented in the processor 902.

In one embodiment, profile logic 930 is a means (e.g., hardware, non-transitory computer-readable medium, firmware) for processing bi-temporal user profiles.

The means may be implemented, for example, as an ASIC programmed to process events based on user preferences extracted from user related events. The means may also be implemented as stored computer executable instructions that are presented to computer 900 as data 916 that are temporarily stored in memory 904 and then executed by processor 902.

Profile logic 930 may also provide means (e.g., hardware, non-transitory computer-readable medium that stores executable instructions, firmware) for event processing. In one embodiment, the instructions include detecting an event that occurs at a valid event time; accessing a repository of profile records having an associated valid time period, retrieving a prior profile record having a prior valid time period, updating the prior profile record with an associated valid event time as a new setting for valid time end, creating an updated profile record having the valid time start set to the valid event time and the valid time end set to the old setting for valid time end of the prior profile record, and saving the updated and prior profile records for future processing.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the various methods described herein, for example, with respect to FIGS. 1-8.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these. For example, a user may refer to a singular person, groups of persons, an organization, an enterprise, and so on.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
    accessing an artifact that is stored in a content management system, where the artifact comprises a document that is stored in the content management system;
    analyzing the artifact to i) detect an event, ii) derive a valid event time corresponding to a time at which the event occurred, and iii) derive a topic for the event;
    accessing a repository storing user profile records, where a respective user profile record specifies a topic of interest to a respective user and a level of expertise in the topic of interest, and wherein respective user profile records include respective profile valid time periods defined by a profile record start time and a profile record end time;
    identifying an existing user profile record, from the user profile records, that includes the topic for the event; and
    updating the existing user profile record based, at least in part, on the detected event, by
      i) revising the existing user profile record to include the valid event time as the profile record end time; and
      ii) creating an updated user profile record that includes a revised level of expertise in the topic for the event and a profile record start time corresponding to the valid event time.

2. The non-transitory computer-readable medium of claim 1, further comprising:
    retrieving a confidence level associated with the existing user profile record;
    generating a new confidence level based on the retrieved confidence level and the event; and
    associating the new confidence level with the updated user profile record.

3. The non-transitory computer-readable medium of claim 1, where the detecting of the event occurs at a system time subsequent to the valid event time.

4. The non-transitory computer-readable medium of claim 1, further comprising querying the repository of user profile records to return user profile records having a valid time period overlapping with a specified time period or including a specified time period.

5. The non-transitory computer-readable medium of claim 1, further comprising deriving a user profile record based on event data for events that occurred at a specified valid event time that is prior to the current time and storing data describing the derived user profile record with a profile record valid time period corresponding to the specified valid event time.

6. The non-transitory computer-readable medium of claim 1, further comprising:
   storing content data in a content data repository at a transaction time, where the content data is associated with respective events occurring at respective valid event times prior to the transaction time, and further where the content data comprises artifacts;
   selecting a first event having a first valid event time;
   retrieving a user profile record having a valid time period overlapping with the first valid event time; and
   updating the retrieved user profile record based on content data associated with the first event.

7. The non-transitory computer-readable medium of claim 1, where a user profile record includes a level of expertise of a user with respect to a topic of interest, and further comprising querying the repository for user profile records having a given level of expertise with respect to a topic of interest during a specified profile record valid time period.

8. The non-transitory computer-readable medium of claim 1 comprising deriving the valid event time based, at least in part, on an evaluation of a temporal logic expression associated with the event.

9. The non-transitory computer-readable medium of claim 1 comprising deriving the valid event time based, at least in part, by executing a flashback query.

10. A computing system, comprising:
    a profile repository configured to store one or more user profile records, where a respective user profile record specifies a topic of interest and a level of expertise in the topic of interest for a respective user, and wherein respective user profile records include respective profile valid time periods defined by a profile record start time and a profile record end time;
    a content repository storing artifacts, where a respective artifact comprises a document that is stored in the content repository for collaborative access by other users;
    a processor; and
    a profile logic configured to cause the processor to:
        access an artifact in the content repository;
        analyze the accessed artifact to i) detect a first event, ii) derive a first valid event time corresponding to a time at which the first event occurred, and iii) derive a topic for the first event;
        access the profile repository;
        identify an existing user profile record, from the one or more user profile records, that includes the topic for the first event;
        update the existing user profile record based, at least in part, on the detected first event, by i) revising the existing user profile record to include the first valid event time as the profile record end time, and ii) creating an updated user profile record that includes a revised level of expertise in the topic for the first event and a profile record start time corresponding to the first valid event time.

11. The computing system of claim 10, where the profile logic is configured to:
    determine a confidence level associated with the existing user profile record;
    compute a new confidence level based on the confidence level and the first event; and
    associate the new confidence level with the updated user profile record.

12. The computing system of claim 10, where the detecting of the first event occurs at a transaction time subsequent to the first valid event time.

13. The computing system of claim 10, where the profile logic is configured to query the repository of user profile records to return user profiles having a valid time period that includes a specified time.

14. The computing system of claim 10, where the profile logic is configured to derive a user profile record based on event data for events that occurred at a specified valid event time prior to the current time, determine a valid time period from the specified valid event time, and store data describing the derived user profile record valid time period matching the determined valid time period.

15. The computing system of claim 10, where the profile logic is configured to:
    select an event having a valid event time;
    retrieve a user profile record having a profile valid time period that overlaps with the valid event time of the selected event; and
    update the retrieved user profile record based on content data associated with the selected event.

16. The computing system of claim 10, where a user profile record includes a level of expertise a user has with respect to a topic of interest, and further comprising querying the profile repository for user profile records having a given level of expertise with respect to a topic of interest at a specified valid time.

17. A non-transitory computer-readable medium storing computer-executable instructions that when executed by a computer cause the computer to perform a method, the method comprising:
    accessing an artifact that is stored in a content management system at a transaction time, where the artifact comprises a document that is stored in the content management system at a transaction time;
    analyzing the artifact to i) detect an event, ii) derive a valid event time corresponding to a time at which the event occurred, and iii) derive a topic for the event;
    identifying a prior user profile record, from one or more user profile records, that includes the topic for the event, where a respective user profile record specifies a topic of interest to a respective user and a level of expertise in the topic of interest;
    updating the prior user profile record based, at least in part, on the event to create an updated profile record, wherein respective user profile records include respective profile valid time periods defined by a profile record start time and a profile record end time, the updated user profile record comprising:
        a revised level of expertise in the topic for the event determined by revising the level of expertise in the topic for the event from the prior user profile record based, at least in part on the detected event; and
        the valid event time derived from the artifact as a start time;
    associating the valid event time derived from the artifact with the prior user profile record as an end time;

storing the updated profile record and the prior user profile record in a profile repository; and processing queries on user profiles stored in the profile repository based on the profile valid time periods defined in the user profile records.

18. The non-transitory computer-readable medium of claim 17, further determining a causal relationship between the updating of the prior user profile record and the event.

19. The non-transitory computer-readable medium of claim 17, further comprising querying the repository of user profiles to return user profile records having a valid time period that includes a specified time.

20. The non-transitory computer-readable medium of claim 17, where a user profile includes a level of expertise a user has with respect to a topic of interest, and further comprising querying the repository for user profile records having a given level of expertise with respect to a topic of interest during a specified valid time period.

21. The non-transitory computer-readable medium of claim 17, further comprising deriving a user profile based on event data for events that occurred prior to a specified time and storing data describing the derived user profile records and a profile record valid time period corresponding to the specified time in the profile repository.

22. The non-transitory computer-readable medium of claim 17, further comprising:

storing content data in a content repository at a first transaction time, where the content data is associated with respective events occurring at respective valid event times prior to the first transaction time;

selecting a first event having a first valid event time;

retrieving a user profile record from the profile repository having a valid time period that includes the first valid event time; and updating the user profile record based on content data associated with the first event.

23. The non-transitory computer-readable medium of claim 1, further comprising:

detecting a subsequent event and deriving i) a topic of the subsequent event and ii) a subsequent valid event time;

querying the repository to return user profile records that i) include the topic of the subsequent event and ii) have a profile record end time or a profile record start time within a predetermined time period following the subsequent valid event time;

analyzing the returned records to determine a number of users that have profile records that were updated to reflect an increased level of expertise in the topic of the subsequent event; and determining a level of influence of the subsequent event, based at least in part, on the number.

* * * * *

UNITED STATES PATENT AND TRADEMARK OFFICE
CERTIFICATE OF CORRECTION

PATENT NO. : 8,965,889 B2  
APPLICATION NO. : 13/401195  
DATED : February 24, 2015  
INVENTOR(S) : Chan et al.

Page 1 of 1

It is certified that error appears in the above-identified patent and that said Letters Patent is hereby corrected as shown below:

In the specification

In column 8, line 12, delete "the a" and insert -- the --, therefor.

In column 15, line 61, delete "profile," and insert -- profile --, therefor.

In column 18, line 26, delete "$t_1$." and insert -- $t_{-1}$. --, therefor.

In column 21, line 38, delete "$(\Phi, j) \vdash \neg q \wedge \circ(q \cup t),$" and insert -- $(\Phi, j) \models \neg q \wedge \circ(q \cup t),$ --, therefor.

Signed and Sealed this  
Twentieth Day of October, 2015

Michelle K. Lee  
*Director of the United States Patent and Trademark Office*